June 5, 1923.
V. V. VEENSCHOTEN
1,457,564
STOKER CONTROLLING MECHANISM
Filed July 18, 1918
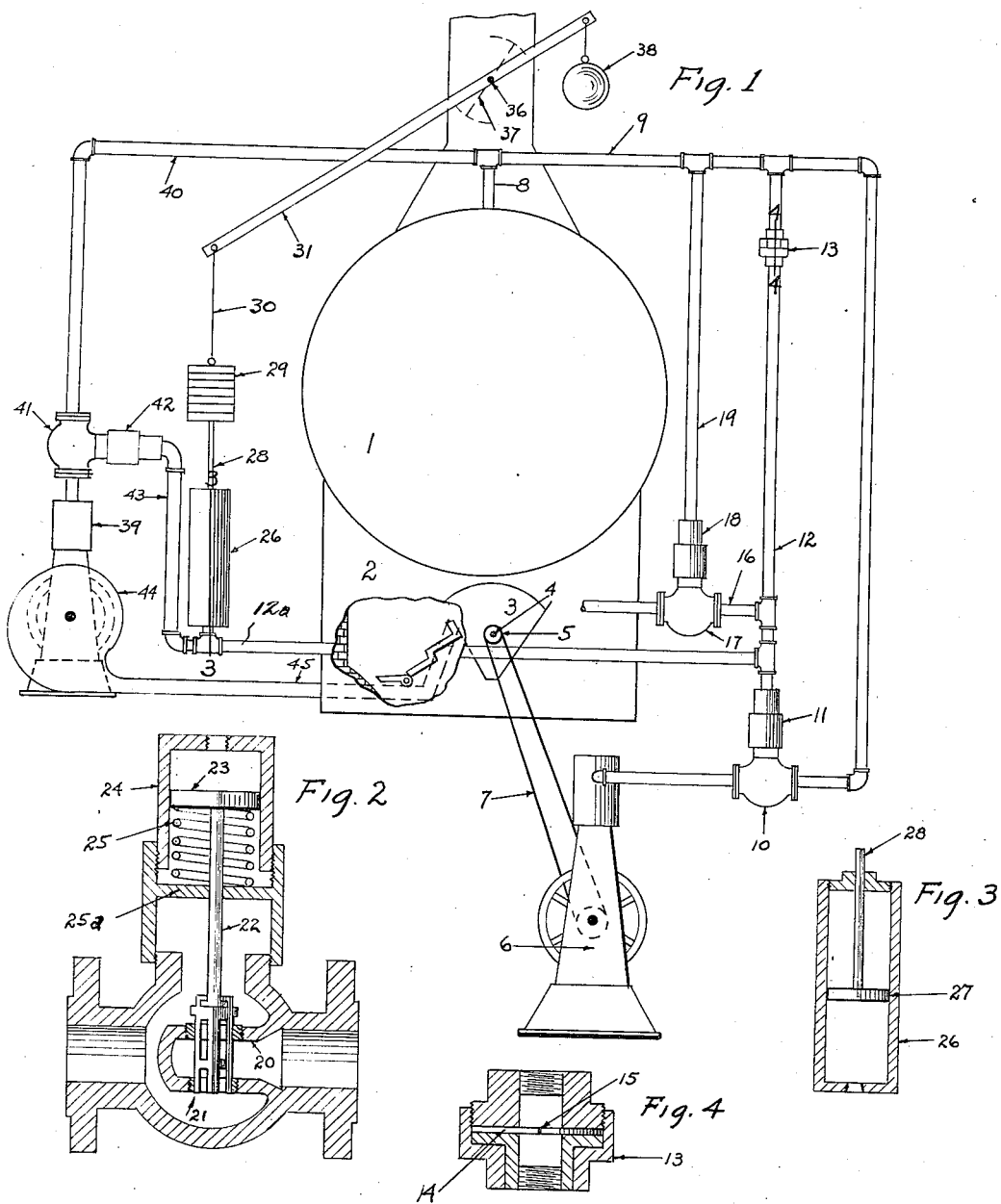

Patented June 5, 1923.

1,457,564

UNITED STATES PATENT OFFICE.

VINCENT V. VEENSCHOTEN, OF ERIE, PENNSYLVANIA, ASSIGNOR TO NORTHERN EQUIPMENT COMPANY, OF ERIE, PENNSYLVANIA, A CORPORATION OF PENNSYLVANIA.

STOKER-CONTROLLING MECHANISM.

Application filed July 18, 1918. Serial No. 245,453.

*To all whom it may concern:*

Be it known that I, VINCENT V. VEENSCHOTEN, a citizen of the United States, residing at Erie, in the county of Erie and State of Pennsylvania, have invented new and useful Improvements in Stoker-Controlling Mechanism, of which the following is a specification.

This invention relates to stoker controlling mechanisms and consists in certain improvements in the construction thereof as will be hereinafter fully described and pointed out in the claims.

The invention is illustrated in the accompanying drawings as follows:—

Fig. 1 shows diagrammatically a front elevation of an installation provided with the controlling mechanism.

Fig. 2 a section of one of the motor controlled valves.

Fig. 3 a section on the line 3—3 in Fig. 1.

Fig. 4 a section on the line 4—4 in Fig. 1.

1 marks the boiler, 2 the furnace, 3 the stoker, 4 the operating shaft of the stoker, 5 a sprocket on the shaft 4, 6 a stoker engine, 7 a drive chain between the engine 6 and the sprocket 5, 8 a steam pipe leading from the boiler, 9 a pipe leading from the steam pipe to the engine 6, 10 a throttle valve controlling the engine 6, 11 a motor controlling the throttle valve, and 12 a pipe connecting the pipe 9 with the motor 11.

The union 13 is arranged in the pipe 12. The plate 14 is inserted in the union and forms an obstruction in the pipe 12 and the plate has a minute opening 15 making a measured restriction for the pipe 12. An exhaust pipe 16 leads from the pipe 12. The exhaust is controlled by a valve 17. The valve 17 is controlled by a motor 18 and the motor 18 is connected with the pipe 9 by a pipe 19. The valves 10 and 17 and the motors 11 and 18 may be of similar construction adjusted to the pressures operating upon them and the size of the valves may be varied to accommodate the normal flow of fluid through them. In Fig. 2 a section is shown of the valve and motor which in general construction may be used for the valves 10 and 17 and the motors 11 and 18. The valve body has the usual diaphragm 20 with a throttle valve 21 acting therein. A stem 22 extends from the valve 21 to a piston 23. The piston 23 is arranged in a cylinder 24, the cylinder 24 being connected to a fluid supply, in this case steam from the boiler either by the pipe 12 or 19 as the case may be. A spring 25 is arranged under the piston and rests on a bridge 25ª at the bottom of the cylinder. The spring tends to force the piston upwardly and with it the valve upwardly and the valve is so arranged that an upward movement thereof opens the valve.

In the operation of the device full steam pressure is delivered through the pipe 19 to the motor 18. The spring 25 in the motor 18 is of sufficient strength to maintain the valve 17 open at any pressure below the desired maximum pressure and the spring 25 in the motor 11 is sufficient to open the valve 10 at any pressure below the desired maximum pressure in the pipe 12. The valve 17 controls an exhaust from the pipe 12 and this operating with the restriction 15 accomplishes the variation in the pressure in the pipe 12 very much in excess of the variations in pressure in the boiler itself. If the valve 17 is entirely closed the pressure in the pipe 12 will build up to full boiler pressure. If the opening in the valve 17 is slight this slight opening will discharge steam so that, with steam supplied through the restriction 15, the pressure will be much below boiler pressure. With a continued opening of the valve 17 the pressure in the pipe 12 will follow to nearly atmospheric pressure. In this way the mechanism acts as an intensifier, intensifying in the pipe 12 changes in pressure in the boiler. By reason of this construction a very sensitive control of the valve 10 may be accomplished notwithstanding the valve is of considerable size. The valve 17 may be made very small and very sensitive and consequently can operate under very slight changes of boiler pressure.

It is desirable to control the damper as the stoker is controlled. In this mechanism the pipe 12ª leads from the pipe 12 to a cylinder 26. A piston 27 is arranged in this cylinder and a stem 28 projects from the piston and a weight 29 is arranged on the stem 28 and the movement of the piston is resisted by this weight. A flexible connection 30 leads to a lever 31. The lever 31 is mounted on a shaft 36 carrying the damper 37. A weight 38 is provided to compel the lever to follow the movement of the stem 28.

It will be readily seen that as the pressure is varied in the pipe 12 this pressure operating on the piston 27 varies the position of the damper so that the damper follows the action of the stoker.

Where a blower is used this also ought to follow the action of the stoker. In the present mechanism the blower engine 39 is connected with the boiler by a pipe 40 leading from the pipe 8. A throttle valve 41 controls the supply leading to the engine 39 and the valve 41 is controlled by a motor 42, the valve and motor being similar to the valve and motor shown in Fig. 2. A pipe 43 leads from the pipe 12ª to the motor 42 so that the motor 42 is subjected to the variations of pressure in the pipe 12. A blower 44 is driven by the engine 39. A pipe 45 leads from the blower to the furnace.

What I claim as new is:—

1. In a stoker controlling mechanism, the combination of a stoker; a steam boiler subjected to the fire from the stoker; a stoker motor; a controlling device for the motor; a fluid actuated controlling motor for said controlling device connected with the boiler; and means for intensifying changes in pressure in the controlling motor over changes of boiler pressure.

2. In a stoker controlling mechanism, the combination of a stoker; a steam boiler subjected to the fire from the stoker; a stoker motor; a controlling device for the motor; a fluid actuated controlling motor for said controlling device; a connection between the motor and the boiler; means for intensifying changes in pressure in the controlling motor over changes in pressure in the boiler comprising an exhaust leading from said connection; a restriction in the connection; a restriction in the exhaust; and means actuated by boiler pressure for varying one of said restrictions.

3. In a stoker controlling mechanism, the combination of a stoker; a steam boiler subjected to the fire from the stoker; a stoker motor; a controlling device for the motor; a fluid actuated controlling motor for said controlling device; a connection between the motor and the boiler; means for intensifying changes in pressure in the controlling motor over changes in pressure in the boiler comprising an exhaust leading from said connection; a restriction in the connection; a restriction in the exhaust; and means actuated by boiler pressure for varying the restriction in the exhaust.

4. In a stoker controlling mechanism, the combination of a stoker; a steam boiler subjected to fire from the stoker; a stoker motor; a controlling device for the motor; a fluid actuated controlling motor for said controlling device connected with the boiler; a damper; a damper motor actuating the damper connected with the boiler; and means for intensifying changes of pressure in the controlling motor and damper motor over changes of boiler pressure.

5. In a stoker controlling mechanism, the combination of a stoker; a steam boiler subjected to the fire from the stoker; a stoker motor; a controlling device for the motor; a fluid actuated controlling motor, said controlling device being connected with the boiler; a blowing motor; a controlling device for said blowing motor; a fluid actuated motor for controlling said controlling device of the blowing motor; and means for intensifying changes in the controlling motors over changes of pressure in the boiler.

6. In a stoker controlling mechanism, the combination of a stoker; a steam boiler subjected to the fire from the stoker; a stoker motor; a controlling device for the stoker motor; a fluid actuated controlling motor for said controlling device connected with the boiler; a damper; a controlling device for the damper; a fluid actuated controlling motor for said controlling device connected with the boiler for the damper; a blowing motor; a controlling device for the blowing motor; a fluid actuated controlling motor for said controlling device of the blowing motor connected with the boiler; and means for intensifying changes in said controlling motors over changes in boiler pressure.

In testimony whereof I have hereunto set my hand.

VINCENT V. VEENSCHOTEN.